March 4, 1958 — H. M. ANHOLT — 2,825,486
SUPREME RINGS
Filed April 28, 1954 — 2 Sheets-Sheet 1

INVENTOR.
Harry M. Anholt
BY
ATTORNEY

March 4, 1958 — H. M. ANHOLT — 2,825,486
SUPREME RINGS
Filed April 28, 1954 — 2 Sheets-Sheet 2
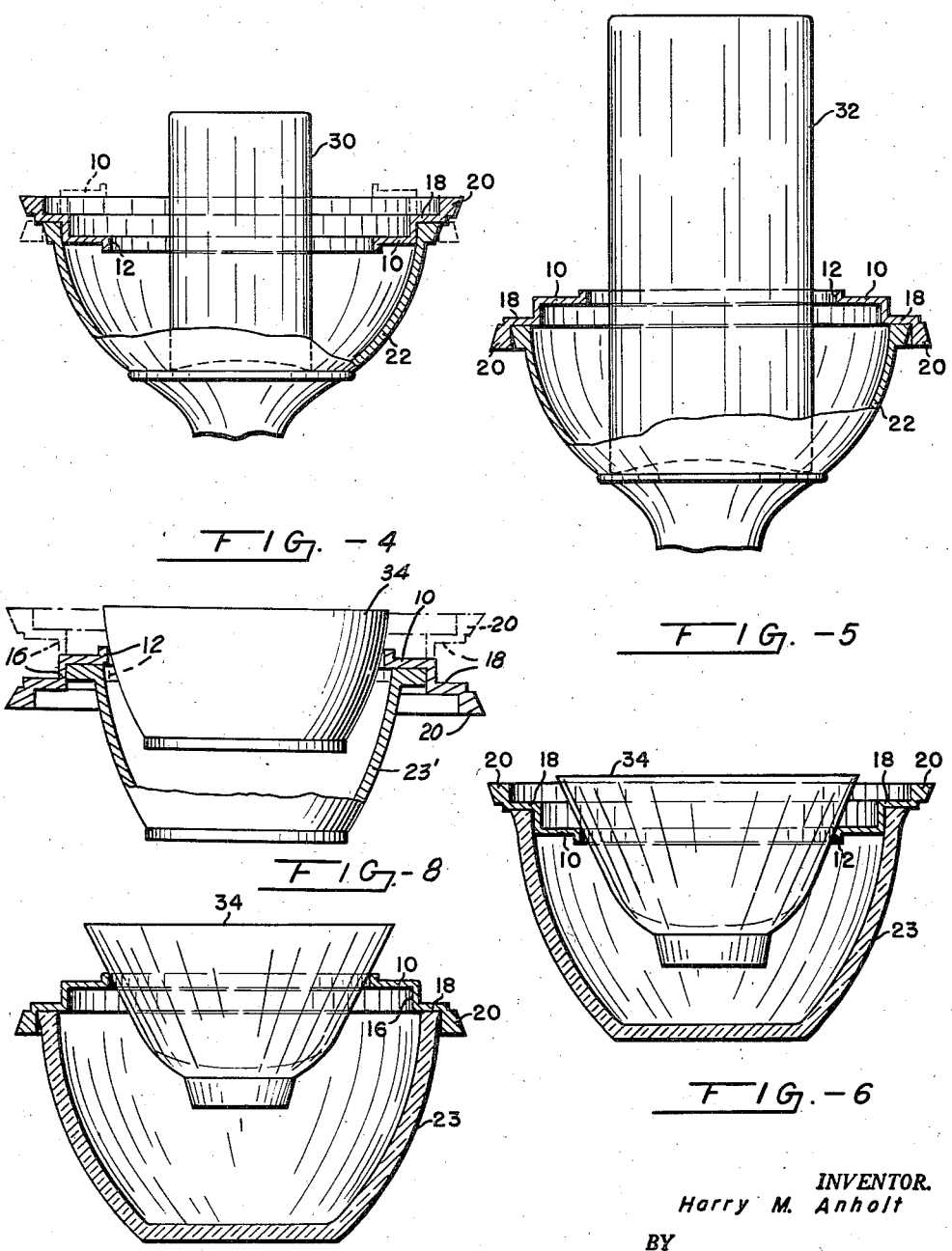
INVENTOR.
Harry M. Anholt
BY
ATTORNEY

United States Patent Office 2,825,486
Patented Mar. 4, 1958

2,825,486

SUPREME RINGS

Harry M. Anholt, Denver, Colo.

Application April 28, 1954, Serial No. 426,067

5 Claims. (Cl. 220—97)

This invention relates to food container supports, and more particularly the invention relates to supreme rings which are adapted to support individual food dishes or glasses in or on a service container.

In the restaurant and hotel trades where the service of food is a fine art, many devices are utilized to make the food more attractive. In a well appointed dining room of excellent cuisine, many food specialties are served in a service dish or nappy, especially foods requiring chilling or which must be kept cool. The service dish may be a low profile bowl-type receptacle or a stemmed goblet-like server. The service dish is considerably larger than any of the food dishes which are held therein, so a supreme ring must be used to support the food dish within the server. Ice may frequently be used to cool the food to thereby present a more attractive array. The supreme ring not only holds seated food containers in the server but supports containers, such as glasses and the like, in an upright position in the ice bath within the server.

The supreme rings which are available are merely flat disks with a central opening and a turned peripheral edge. The central opening supports the food container and the turned edge or lip holds the ring on the lip of the serving dish. While such rings may be satisfactory for certain types of food dishes, they are inadequate for general uses. For example, the rings are adapted to fit only one size of serving dish. Also, small containers, for example small fruit juice glasses, may be inadequately supported or may be partially or wholly covered by the ring so as to make removal of the glass from the server quite difficult.

According to the present invention, there is provided a supreme ring which is adapted to fit various sizes of serving dishes, and is reversible on a standard serving dish to provide support for various sizes and shapes of fruit dishes. The ring is not only adapted to fit various sizes of servers, but is, also, adapted to present various food containers to the user in the most convenient position within the server. While each type of food dish used in the restaurant and hotel trades is a more or less standard item, the size variations between different types of dishes limits the use of a nappy and supreme ring to a few specialized dishes. The ring of the present invention effectively accommodates such standard dishes as are readily purchased on the open market.

In the elegant setting found in most of the fine hotels of the country, it is contemplated that the supreme ring and the supporting serving dishes would be constructed of sterling silver to match the luxury of the surroundings. It is, further, contemplated to provide a supreme ring made of inexpensive plastic in various colors, etc. to extend the use of this particular type of service to establishments of lesser means, but which nevertheless, desire a more elegant and presentable service. The supreme ring of the present invention, therefore, provides means for all classes of establishments to dress up their service of food.

It is an object of the present invention to provide a supreme ring which is adapted for use on various sizes of serving dishes or nappys.

It is another object of the present invention to provide a supreme ring which presents supported food containers to the user in the most convenient position within the server.

It is still another object of the invention to provide a supreme ring which is reversible to accommodate various supported food dishes.

These and other objects of the invention may be ascertained from the following description and illustrations in which:

Fig. 4 is a side elevation, in partial section, showing the supreme ring in use supporting a small juice glass;

Fig. 5 is a side elevation, in partial section, of the supreme ring in use supporting a large juice glass;

Fig. 6 is a sectional view of the supreme ring on a shallow serving dish showing the use of the ring with a food container supported in low position within the serving dish;

Fig. 7 is a side elevation, in section, of the supreme ring in the reverse position of Fig. 6, showing the support of the food dish in highest position or extending above the lip of the serving dish; and Fig. 8 is a side elevational view, partly in section and partly broken away, showing an embodiment of a supreme ring supporting a food container on the upper edge of a serving bowl with the tread portion of the inner step of the ring resting on the rim of the bowl.

Figure 1:
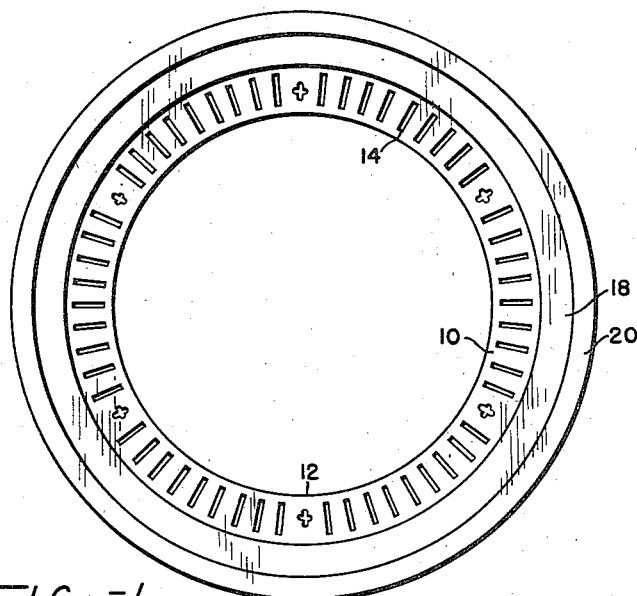
Fig. 1 is a top plan view of a supreme ring according to the present invention.
Figure 2:
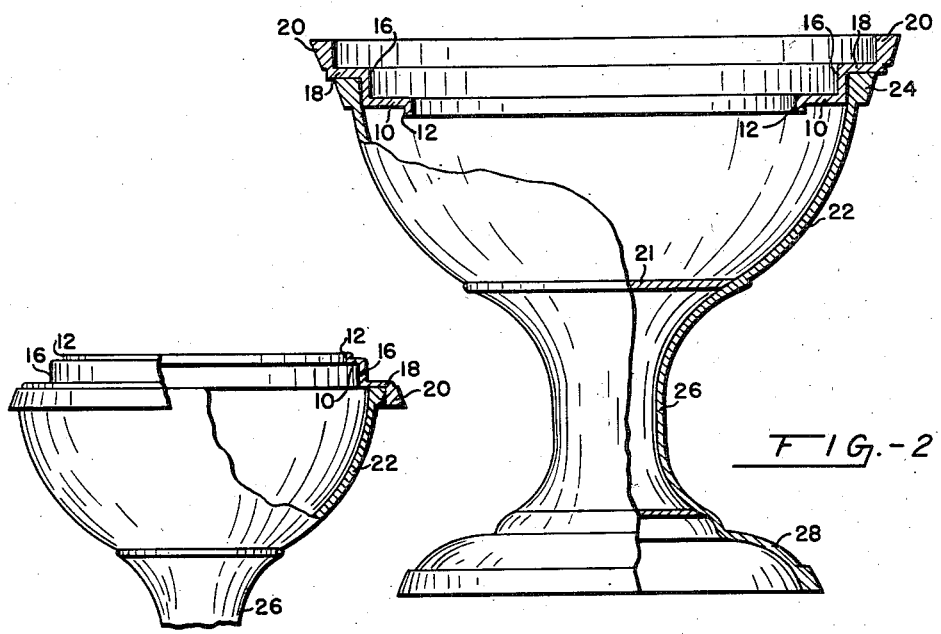
Fig. 2 is a side elevation, in partial section, of a supreme ring according to the present invention seated in position on the edge of a serving dish or nappy.
Figure 3:
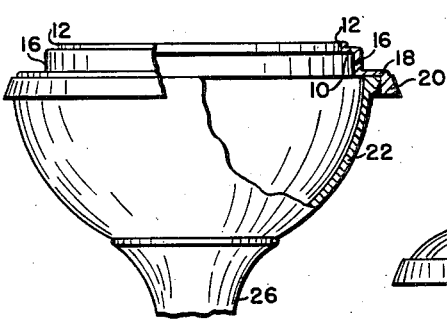
Fig. 3 is a side elevation, in partial section, of the supreme ring of Fig. 2 in reversed position on the serving dish.

The device illustrated comprises a ring having two annular graduated step formations extending successively in the same axial direction. This ring includes an inner step formation having a perforated horizontal or laterally extending annular tread portion 10 with an inturned axially extending or vertical lip or short axial wall 12 around an annular opening of substantial dimensions in relation to the overall dimensions of the supreme ring. Perforations 14 around the disk provide drainage for any liquid which may spill onto the ring, and also provide decoration for the ring. An axially extending wall or riser or vertical part 16 of the inner step formation is secured to the periphery of the tread portion 10 and is adapted to fit within the mouth of a bowl of suitable size of a service receptacle, thereby providing a stop for the ring when seated on the serving piece. The outer step formation includes a horizontal or tread portion 18 extending laterally from the wall 16, and this tread portion is adapted to rest on the rim of a bowl while the vertical portion 16 of the inner step formation fits within the mouth of a bowl of suitable size. This outer step formation also includes a second axial wall or outer vertical part 20 extending from the periphery of the tread portion 18. The radial annular tread portion 10 of the inner step formation may provide a seat on either side of the supreme ring on small serving dishes, as shown in Fig. 8, with the vertical portion 16 of the inner step formation surrounding the rim of a bowl 23' of suitable size, or with the axially extending inner lip 12 fitted within the mouth of the bowl 23' also of suitable size to engage this lip, as shown in dotted lines in this figure. The radial tread portion 18 provides a seat for larger serving dishes on either side of the supreme ring. The supreme ring may therefore be used with several sizes of serving dishes, although the seating of annular tread portion 18 on the lip of a standard size serving dish is preferred. When the ring is seated on the serving dish by means of the disk 18, in one position, shown in Figure 2, the axial wall 16 provides an internal stop for holding the ring on the dish, and the axial wall 20 provides an external stop for the ring in inverted position, shown in Figure 3.

The goblet-like serving dish comprises a bowl 22 having a flat bottom 21 and a lip 24. The bowl is secured to a stem 26 which is secured to a base 28. The flat bottom serving dishes are especially valuable for use with the supreme ring, or for general restaurant serving. For example, the stemmed serving dish may be effectively used for serving cantaloupe. The flat bottom fits the flat cut cantaloupe rind and securely holds the fruit in the server. Also, the serving dish may be used for grapefruit, by inserting a plastic disk, for example, to provide a seating surface high enough to hold a grapefruit half above the edge of the serving dish. As with the cantaloupe, the grapefruit should have a flattened bottom so that it seats securely within the serving dish. When used with the supreme ring, drinking glasses, which are served in an ice bath, seat squarely on the bottom of the serving dish and do not have the tendency to tip as with round bottom serving dishes. The flat bottom serving dish and the supreme ring provide a secure serving arrangement for glasses, and the like. The stepped shape of the supreme ring, and its reversible characteristics provide means for changing the height of any dish held on the ring in the serving dish. The stepped construction, also, provides means for securely seating the supreme ring on various sizes of serving bowls.

As shown in Figure 4, the supreme ring is placed on the serving dish so that the lip 20 is upward away from the dish. In this position, the disk 10 is held in its lowermost position within the dish 22, and the supreme ring is useful for supporting a small juice tumbler 30, for example, in such a position that it is easily accessible to the user. More important, the tumbler is accessible to the person preparing the dish for service. As shown in the dotted lines, by reversing the supreme ring, the amount of the tumbler extending above the ring is so small that the person grasping the glass has only a small portion near the edge of the tumbler available. For sanitary reasons it is desirable not to have the person preparing the food touch the container areas which touch the lips of the consumer. By having a ring which is reversible, a small juice glass may be supported near its middle and placed in the serving dish within the supreme ring so that the person preparing the dish need not come in contact with the area around the lip of the tumbler. Also, the consumer has a large area to grasp the glass and have it ready for drinking without fumbling around to obtain a good grip on the glass. Although the aperture of the supreme ring encircles the glass considerably lower than it would in the dotted position, as shown in Figure 4, it is still sufficient to prevent the tipping of the glass within the serving dish.

For large juice tumblers, the supreme ring is inverted, as shown in Figure 5. A large tumbler 32 seated in a serving bowl 22 extends a considerable distance above the lip of the serving bowl and is therefore easily grasped by both the preparer and the consumer of the dish without coming in contact with the drinking edge of the glass. The tall tumblers, however, are subject to tipping, therefore, the supreme ring is inverted to place the supporting lip 12 at its highest point above the bowl to give maximum support to the tumbler. Even with the ring in this position, tumbler 32 still presents a sufficient area for grasping the glass above the supreme ring but well below the drinking edge both for convenience and for sanitary purposes.

In certain instances, a low profile bowl, such as shown in Figures 6 and 7, is used in serving desserts, etc., or is used in large gatherings in place of the stemmed goblet-like servers. The supreme ring of the present invention fits both the low profile bowl and the stemmed goblets equally well. In this case for either the service of cocktail bowls or dessert dishes, the supreme ring provides efficient service. In Figure 6, the supreme ring is shown in its lowermost position in a bowl 23 supporting a cocktail dish 34. Where the contents of the cocktail dish do not require holding the dish as where they are soft or liquid and liable for spilling, the down position of the supreme ring not only securely holds the bowl but provides a drainage through the perforations for any spilled food back into the bowl 23. Solid bits of food which spill are retained in the space around the cocktail dish. With rather solid contents of the bowl 34, the reversal of the supreme ring holds the bowl 34 up above a serving bowl 33 so that it is readily grasped by the fingers of the consumer. Normally in this condition, the contents of the bowl are such that they do not drip over the side and do not cause a sanitation problem by dripping down the supreme ring onto the table.

While the invention has been described by specific examples and illustrations, there is no intent to limit the invention to the precise details so illustrated, except insofar as set forth in the appended claims.

I claim:

1. A ring having two annular graduated step formations, the outermost step formation having its vertical outer part adapted to surround a rim of a bowl with the horizontal or tread portion of said outermost step formation resting upon the rim of the bowl, and said ring provided at the inner side of the inner step formation with a vertical flange or axially extending lip, said lip being adapted to receive the wall of a receptacle of lesser diameter than said bowl.

2. A device as claimed in claim 1 in which the horizontal or tread portion of the outermost step formation may rest on the rim of a bowl while the vertical portion of the inner step formation fits within the mouth of a bowl of suitable size.

3. A device as claimed in claim 1 in which the horizontal or tread portion of the inner step formation may rest on the rim of a bowl while the vertical portion of the inner step formation surrounds the rim of a bowl of suitable size.

4. A device as claimed in claim 1 in which the horizontal or tread portion of the inner step formation may rest on the rim of a bowl while the vertical flange or axially extending lip fits within the mouth of a bowl of suitable size.

5. A ring having two annular graduated step formations extending successively in the same axial direction, the outermost step formation having its vertical outer part adapted to surround a rim of a bowl with the horizontal or tread portion of said outermost step formation resting upon the rim of the bowl, and said ring provided at the inner edge of the inner step formation with a vertical flange or axially extending lip projecting in the same axial direction as said successive step formations, said lip being adapted to receive the wall of a receptacle of lesser diameter than said bowl.

References Cited in the file of this patent

UNITED STATES PATENTS

| | | |
|---|---|---|
| 226,666 | Mackay | Apr. 20, 1880 |
| 893,469 | Essmuller | July 14, 1908 |
| 945,589 | Peterson | Jan. 4, 1910 |
| 947,373 | Coleman | Jan. 25, 1910 |
| 1,123,793 | Pick | Jan. 5, 1915 |
| 1,225,870 | Schwing | May 15, 1917 |
| 1,745,935 | Kirmser | Feb. 4, 1930 |
| 1,922,992 | Tighe | Aug. 15, 1933 |
| 1,948,778 | Zoia | Feb. 27, 1934 |
| 1,973,447 | Schroeder | Sept. 11, 1934 |
| 2,172,469 | Grigas | Sept. 12, 1939 |

FOREIGN PATENTS

| | | |
|---|---|---|
| 222,796 | Great Britain | Oct. 9, 1924 |
| 236,045 | Great Britain | July 2, 1925 |
| 465,844 | Germany | Sept. 26, 1928 |